(12) United States Patent
Wang et al.

(10) Patent No.: US 11,379,147 B2
(45) Date of Patent: Jul. 5, 2022

(54) METHOD, DEVICE, AND COMPUTER PROGRAM PRODUCT FOR MANAGING STORAGE SYSTEM

(71) Applicant: EMC IP Holding Company LLC, Hopkinton, MA (US)

(72) Inventors: Yi Wang, Chengdu (CN); Jun Tang, Chengdu (CN); Qingxiao Zheng, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 159 days.

(21) Appl. No.: 16/775,194

(22) Filed: Jan. 28, 2020

(65) Prior Publication Data
US 2021/0096763 A1 Apr. 1, 2021

(30) Foreign Application Priority Data
Sep. 26, 2019 (CN) .......................... 201910919526.2

(51) Int. Cl.
*G06F 3/06* (2006.01)
(52) U.S. Cl.
CPC ............ *G06F 3/0653* (2013.01); *G06F 3/067* (2013.01); *G06F 3/0608* (2013.01); *G06F 3/0659* (2013.01)
(58) Field of Classification Search
None
See application file for complete search history.

(56) References Cited

U.S. PATENT DOCUMENTS

| | | | | |
|---|---|---|---|---|
| 9,645,897 B2* | 5/2017 | Diederich | ............. | G06F 3/0619 |
| 9,940,378 B1* | 4/2018 | Rothmeier | .......... | G06F 11/1453 |
| 10,540,323 B2* | 1/2020 | Blagojevic | ............ | G06F 3/0659 |
| 2007/0073985 A1* | 3/2007 | Wilkes | ................ | G06F 11/2074 |
| | | | | 711/161 |
| 2009/0177836 A1* | 7/2009 | Mimatsu | ............... | G06F 16/122 |
| | | | | 711/111 |
| 2013/0138884 A1* | 5/2013 | Kawamura | .......... | G06F 12/0866 |
| | | | | 711/119 |

* cited by examiner

Primary Examiner — Idriss N Alrobaye
Assistant Examiner — Dayton Lewis-Taylor
(74) Attorney, Agent, or Firm — Womble Bond Dickinson (US) LLP

(57) ABSTRACT

The present disclosure relates to a method, device and computer program product for managing a storage system. The storage system comprises a first storage device and a second storage device. In the method, a data object specified by a write request is searched for in the first storage device, the write request specifying the data object that is to be written to the storage system. According to determining that the data object is not present in the first storage device, the second storage device is notified to search for the data object in the second storage device. The data object is written to the storage system according to a search result of searching for the data object in the second storage device. An address mapping of the data object is determined based on an address to which the data object is written in the storage system, where the address mapping indicates an address of the data object in the storage system, and the method is implemented at the first storage device. The storage system may be managed in a more effective way, and the number of storage devices in the storage system may be extended easily. Further, provided are a corresponding device and computer program product.

20 Claims, 9 Drawing Sheets

METHOD, DEVICE, AND COMPUTER PROGRAM PRODUCT FOR MANAGING STORAGE SYSTEM

CROSS-REFERENCE TO RELATED APPLICATION

This patent application claims priority, under 35 U.S.C. § 119, of Chinese Patent Application No. 201910919526.2, filed Sep. 26, 2019, entitled "Method, Device, and Computer Program Product for Managing Storage System."

FIELD

Various implementations of the present disclosure relate to management of storage systems, and more specifically, to a method, device and computer program product for managing access to a storage system.

BACKGROUND

With the development of data storage technology, now various data storage devices provide increasingly large data storage capacity to user application systems. However, for data security and other reasons, a user application system may continuously store to a storage system copies of a data object which are generated at different time points. As time elapses, the storage space in the storage system may run out.

Technical solutions for extending the storage space in a storage system have been proposed. However, existing technical solutions usually need data migration or a complex management mechanism in order to ensure the stable operation of the storage system. At this point, it has become a research focus regarding how to manage the storage system in a more effective way and provide extensibility.

SUMMARY

Therefore, it is desirable to develop and implement a technical solution for managing a storage system more effectively. It is desired that the technical solution be compatible with an existing application system to manage a storage system more effectively by reconstructing configurations of the existing storage system.

According to a first aspect of the present disclosure, provided is a method for managing a storage system, here the storage system comprises a first storage device and a second storage device. In the method, a data object specified by a write request is searched for in the first storage device, the write request specifying the data object that is to be written to the storage system. According to determining that the data object is not present in the first storage device, the second storage device is notified to search for the data object in the second storage device. The data object is written to the storage system according to a search result of searching for the data object in the second storage device. An address mapping of the data object is determined based on an address to which the data object is written in the storage system, where the address mapping indicates an address of the data object in the storage system, and the method is implemented at the first storage device.

According to a second aspect of the present disclosure, provided is a device for managing an address mapping of a storage system, where the storage system comprises a first storage device and a second storage device. The device comprises: at least one processor; and a memory coupled to the at least one processor, the memory having instructions stored thereon, the instructions, when executed by the at least one processor, causing the device to perform acts. The acts include: searching for a data object specified by a write request in the first storage device, the write request specifying the data object that is to be written to the storage system; according to determining the data object is not present in the first storage device, notifying the second storage device to search for the data object in the second storage device; writing the data object to the storage system according to a search result of searching for the data object in the second storage device; and determining an address mapping of the data object based on an address to which the data object is written in the storage system, wherein the address mapping indicates an address of the data object in the storage system, the method being implemented at the first storage device.

According to a third aspect of the present disclosure, provided is a computer program product. The computer program product is tangibly stored on a non-transitory computer readable medium and comprises machine executable instructions which are used to implement a method according to the first aspect of the present disclosure.

BRIEF DESCRIPTION OF THE DRAWINGS

Through the more detailed description in the accompanying drawings, features, advantages and other aspects of the implementations thereof, the present disclosure will become more apparent. Several implementations of the present disclosure are illustrated schematically and are not intended to limit the present invention. In the drawings.

DETAILED DESCRIPTION OF IMPLEMENTATIONS

The preferred implementations of the present disclosure will be described in more detail with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can comprise other explicit and implicit definitions.

Various technical solutions have been provided to extend the storage space in a storage system. In one technical solution, when the storage space of an existing storage device in a storage system is about to run out, a new storage device with larger storage space may be deployed, and data in the existing storage device may be migrated to the new storage device. However, this technical solution leads to a lot of time and bandwidth overheads for data migration.

Figure 1:
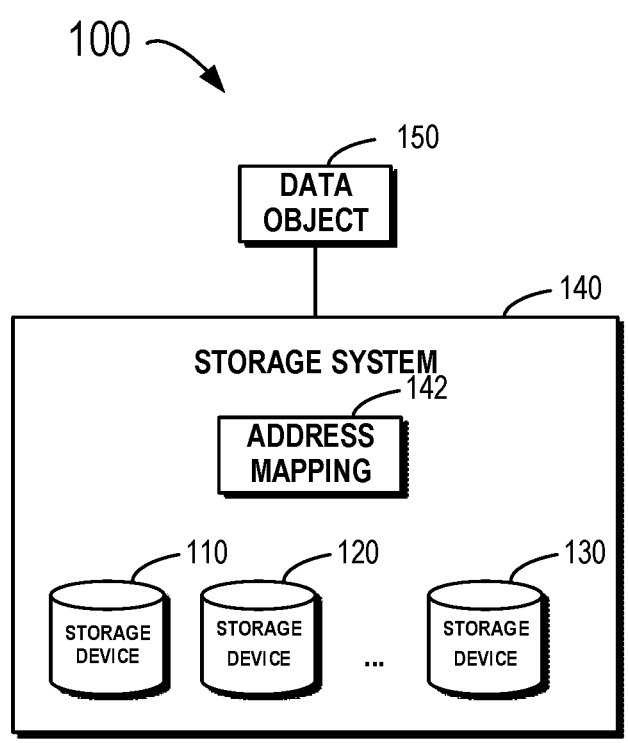
FIG. 1 schematically shows a block diagram of an application environment comprising a distributed storage system.

In another technical solution, the storage space is proposed to extend in a distributed storage system. With reference to FIG. 1, description is presented below to an outline of a distributed storage system. FIG. 1 shows a schematic view of an application environment 100 comprising a distributed storage system 140. As depicted, the storage system 140 may comprise a plurality of storage devices 110, 120, . . . , and 130. Further, the storage system 140 may comprise an address mapping 142, which may map a data object 150 from a user to one or more storage devices.

It will be understood that the data object 150 here may be provided as different types. For example, the data object 150 may be a video file, an audio file, a text file, etc. Further, the data object 150 may have different sizes. If the data object 150 is large (e.g., an HD movie), then the data object 150 may be divided into a plurality of smaller blocks, and the plurality of blocks may be stored to a plurality of storage devices in the storage system 140, respectively. At this point, the address mapping 142 may record mapping relations between the data object 150 and one or more blocks of the data object 150. In other words, the address mapping 142 needs to record to which storage device(s) in the storage system each block of the data object 150 is stored, and also needs to record an address(es) in the storage device(s).

When the storage space in the storage system 140 is insufficient, it may be extended by adding a new storage device to the storage system. At this point, although data in an existing storage device does not need to be migrated to the new storage device, this technical solution leads to a complex management procedure so as to ensure the plurality of storage devices in the storage system 140 work in harmony.

Figure 2:
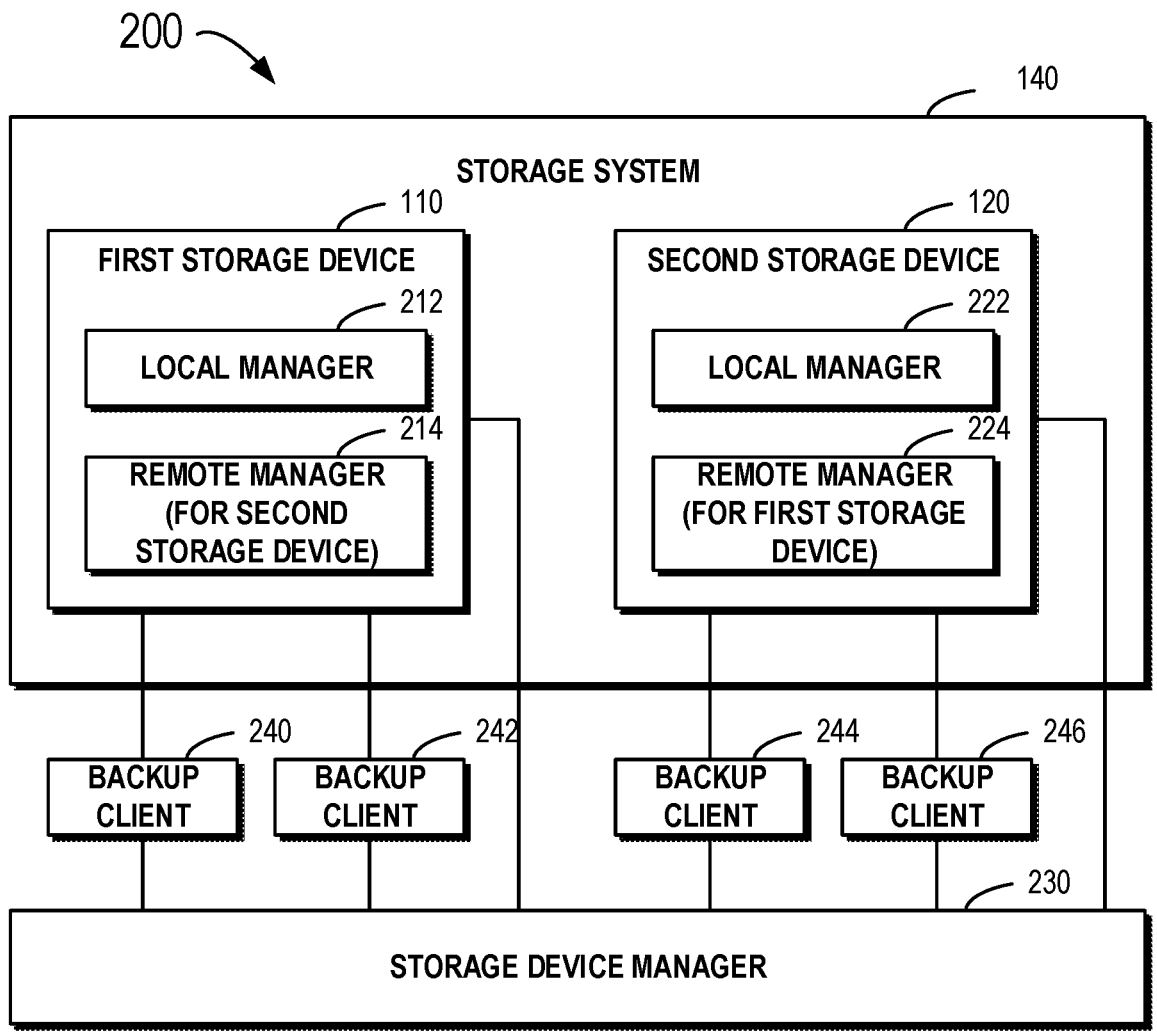
FIG. 2 schematically shows a block diagram of an architecture for managing a storage system according to one implementation of the present disclosure.

In order to solve the above drawbacks, implementations of the present disclosure provide a method, device and computer program product for managing a storage system. First of all, description is presented to an outline of implementations of the present disclosure with reference to FIG. 2. This figure schematically shows a block diagram of an architecture 200 for managing a storage system according to one implementation of the present disclosure. As depicted, the storage system 140 may comprise a first storage device 110 and a second storage device 120. For the sake of description, FIG. 2 illustrates only two storage devices. However, it will be understood that the storage system may further comprise more storage devices.

According to example implementations of the present disclosure, concepts of local manager and remote manager are introduced. Each storage device may comprise a local manager and a remote manager. As shown in FIG. 2, the first storage device 110 may comprise a local manager 212 and a remote manager 214, and the second storage device 120 may comprise a local manager 222 and a remote manager 224. It will be understood that functions of local managers and remote managers in a plurality of storage device are similar to one another. Description is presented below by taking the local manager 212 and the remote manager 214 in the first storage device 110 as one example.

According to example implementations of the present disclosure, the local manager may be used to manage a transaction associated with data access performed in a local storage device. For example, the local manager 212 may be used to manage transactions such as searching for a data object in the first storage device 110, writing a data object to the first storage device 110, reading a data object from the first storage device 110 and so on. The remote manager may be used to manage a transaction associated with data access performed in a remote storage device other than a local storage device. For example, the remote manager 214 may be used to manage transactions such as searching for a data object in the second storage device 120, reading a data object from the second storage device 120 and so on.

As shown in FIG. 2, a backup client may be provided so as to collect from a user application system (not shown) a data object which needs to be backed up. One or more backup clients may be allocated to each storage device. One backup client may correspond to one user application system. For example, clients 240 and 242 may be allocated to the first storage device 110, and backup clients 244 and 246 may be allocated to the second storage device 120. At this point, the first storage device 110 will handle requests from the backup clients 240 and 242 (e.g., a write request for writing a data object to the storage system 140, and a read request for reading a data object from the storage system 140).

According to example implementations of the present disclosure, a storage device manager 230 may be deployed so as to coordinate various storage devices in the storage system 140. Alternatively and/or additionally, the storage device manager 230 may further be responsible for managing a plurality of backup clients. Although in FIG. 2 the storage device manager 230 is shown to be independent of storage devices in the storage system 140, it will be understood that the storage device manager 230 may further be deployed at a device in the storage system. For example, the storage device manager 230 may be deployed at the first storage device 110.

Figure 3:
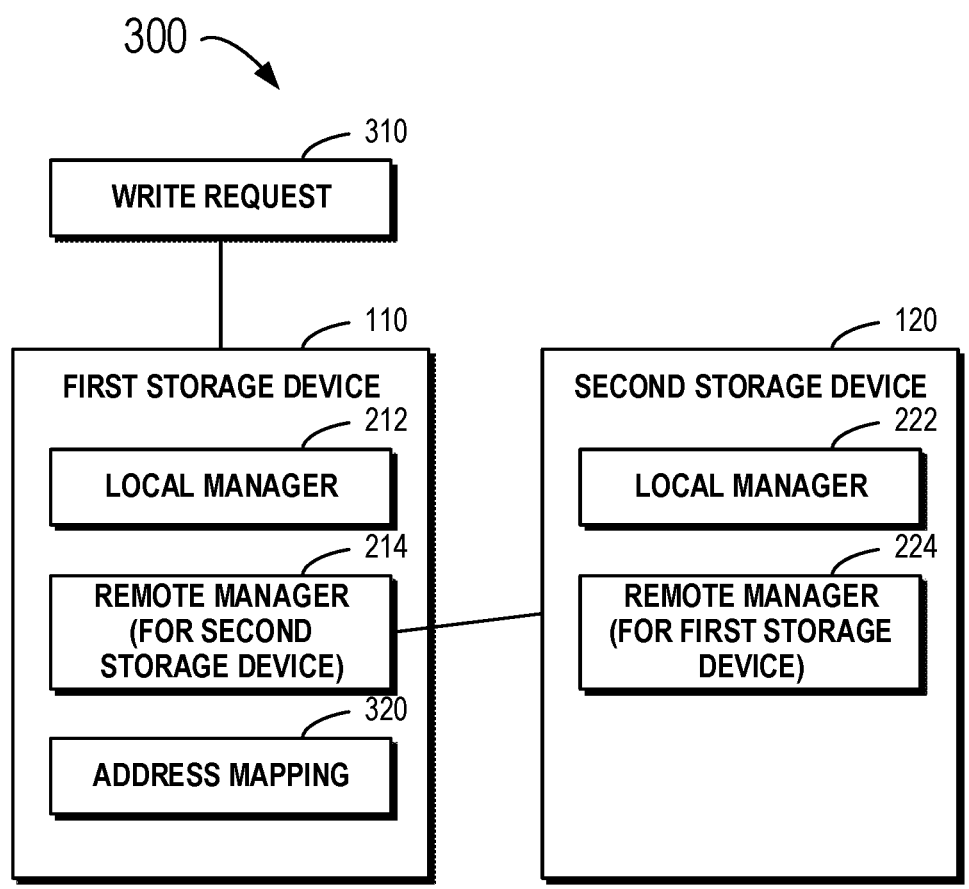
FIG. 3 schematically shows a block diagram of the procedure for managing a storage system according to one implementation of the present disclosure.

More details about implementations of the present disclosure will be described with reference to FIG. 3. This figure schematically shows a block diagram 300 of a procedure for managing the storage system 140 according to one implementation of the present disclosure. As depicted, the first storage device 110 may receive a write request 310 for writing a data object to the storage system 140, here the first storage device 110 comprises storage space. In order to avoid the presence of duplicated data objects, before a data object is written to the first storage device 110, first the data object may be searched for in the first storage device 110. If the data object is present, then the existing data object in the first storage device 110 may be used instead of writing duplicated data to the storage system 140. For example, the operation may be performed by the local manager 212.

If it is determined that the data object is not present in the first storage device 110, a search needs to be carried out in the second storage device 120 other than the first storage device 110. Here the second storage device 120 is a remote storage device other than the first storage device 110. The data object may be written to the storage system 140 according to a search result of searching for the data object in the second storage device 120. According to example implementations of the present disclosure, an address mapping 320 is provided for indicating addresses of various data objects in the storage system 140. Further, the address mapping 320 of a data object may be determined based on an address of the storage system 140 to which the data object is written. Operations performed at the second storage device 120 may be controlled by the remote manager 214. For example, the remote manager 214 may send a message to the second storage device 120 to instruct the second storage device to perform an operation accordingly. The remote manager 214 may further receive a response from the second storage device 120.

Figure 4:
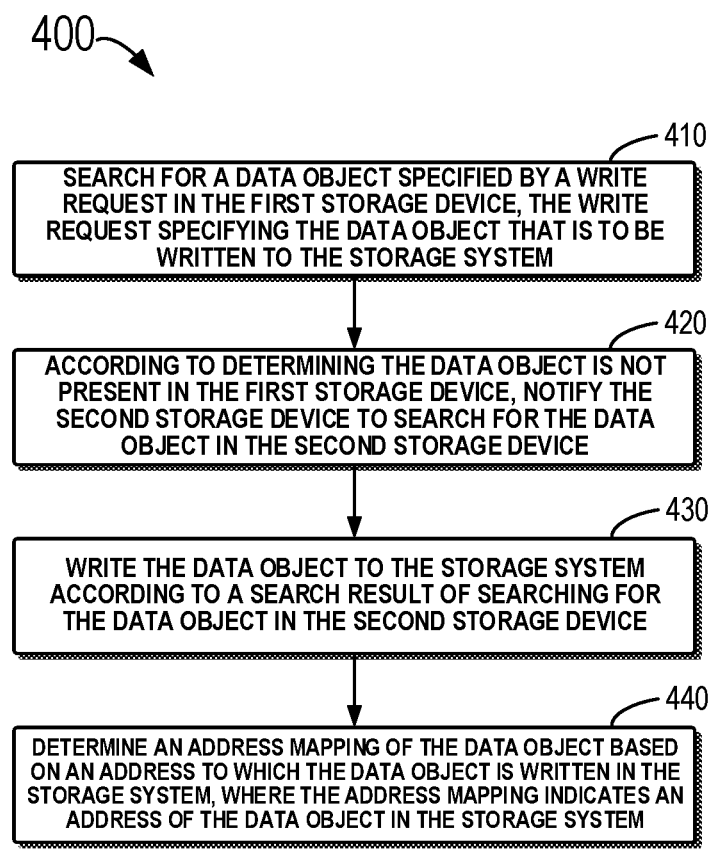
FIG. 4 schematically shows a flowchart of a method for managing a storage system according to one implementation of the present disclosure.

With reference to FIG. 4, description is presented below to more details about implementations of the present disclosure. FIG. 4 schematically shows a flowchart 400 of a method for managing the storage system 140 according to one implementation of the present disclosure. At block 410, a data object specified by a write request is searched for in the first storage device 110, the write request specifying the data object that is to be written to the storage system 140. It will be understood that the write request 310 may be received by a backup client installed at a user application system. At this point, the storage system 140 is connected to the user application system so as to store backups of data objects in the user application system. Here the backup client may collect demands from the user application system and forward the demands to the first storage device 110.

It will be understood that the storage system 140 may serve a large number of user application systems. At this point, which storage device serves which user application system may be determined in view of a backup demand of each user application system and a workload of each storage device in the storage system 140. According to example implementations of the present disclosure, regarding a specific user application system, a storage device for serving the user application system may be selected from the first storage device 110 and the second storage device 120 based on a first workload of the first storage device 110, a second workload of the second storage device 120 and a backup demand of the user application system. Subsequently, the user application system may be registered to the selected storage device.

According to example implementations of the present disclosure, the workload may comprise various contents, including but not be limited to, free storage space in the storage device, utilization efficiency of a processor of the storage device, utilization efficiency of a memory of the storage device, the number of user application systems that the storage device is serving, the number of requests that are handled by the storage device, a currently available bandwidth of the storage device, etc. Suppose the second workload is much heavier than the first workload, then the first storage device 110 with a lower workload may be selected for serving the specific user application system. Subsequently, the specific user application system may be registered to the first storage device 110.

According to example implementations of the present disclosure, the storage device manager 230 as shown in FIG. 2 may be created for managing the above registration. According to example implementations of the present disclosure, a container may further be created in each storage device. The remote manager described above may be deployed in the container. For example, a container may be deployed in the first storage device 110, and the remote manager 214 may be installed in the container. A container may be deployed in the second storage device 120, and the remote manager 224 may be installed in the container. By means of containers, system configuration conflicts caused by different managers may be avoided. Further, since the container does not need a dedicated operating system to run each manager, the management complexity in the storage device may be reduced.

According to example implementations of the present disclosure, the data object may be searched for in the storage device based on a hash of the data object. It will be understood that the hash of the data object may be generated based on various approaches, for example, abstract information may be generated based on algorithms like MD5, SHA1, SHA256, CRC and so on. The first storage device 110 may obtain the hash of the data object in various ways. To save the bandwidth of data transmission, for example, the hash of the data object to be backed up may be generated by the backup client and included in the write request 310. Alternatively and/or additionally, the hash of the data object to be backed up may further be generated by the user application system.

It will be understood that the first storage device 110 and the second storage device 120 may be provided as the same or different types, so storage rules of various storage devices may be different. At this point, a storage rule of the storage device may be determined first, and then the data object may be searched for according to the corresponding storage rule. Specifically, a data object matching the hash may be searched for in the first storage device 110 based on a first storage rule of the first storage device 110. The obtained hash may be compared with a hash of each data object in the first storage device 110, so as to determine whether the data object to be written is present in the first storage device 110 or not.

It will be understood that the hash here may have various types, i.e., metadata-based hash and data block-based hash. When the data object has a large data amount, the data object may comprise a plurality of data blocks, at which point a hash may be generated for each data block. Suppose the data object comprises 2 data blocks, at this point a metadata-based hash may be generated, and further two data block-based hashes may be generated. It will be understood that only a metadata-based hash may be generated, or only a data block-based hash may be generated.

Figure 5:
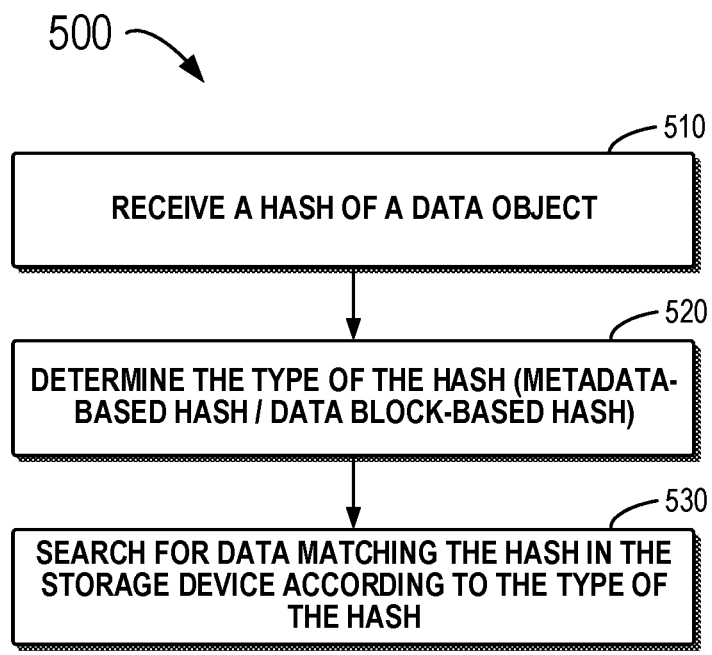
FIG. 5 schematically shows a flowchart of a method of searching for a data object in a storage device according to one implementation of the present disclosure.

With reference to FIG. 5, description is presented on how to search for a data object in the first storage device 110. It will be understood if the data object matching a metadata-based hash is found in the first storage device 110, then there is no need to perform processing to each data block, but an address of the matching data object may be directly used to determine the address mapping 320. According to example implementations of the present disclosure, where a group of data block-based hashes are present, a group of data blocks matching the group of hashes may be searched for in the first storage device 110.

Processing may be performed on each data block in the group of data blocks. For example, a data block matching the hash of each data block may be searched for in the first storage device 110. If the data block is found, it is considered that the data block is already stored in the first storage device 110. There is a possibility that the first storage device 110 only comprises one part of data blocks of the data object. At this point, the portion associated with the found data block of the address mapping 320 may be determined based on an address of the data block. Further, other data blocks that are not present in the first storage device 110 may be searched for in the second storage device 120.

FIG. 5 schematically shows a flowchart of a method 500 for searching for a data object in a storage device according to one implementation of the present disclosure. At block 510, first a hash of the data object may be received, e.g., received from the write request 310. Then at block 520, the type of the hash may be determined. Here the hash type may comprise metadata-based hash and data block-based hash. At block 530, data matching the hash may be searched for in the storage device according to the determined type of the hash.

According to example implementations of the present disclosure, before storing the data object to the storage system 140, first a "de-duplication" operation is supposed to be performed. The purpose of carrying out a search based on the hash is to determine whether the data object (or part of data blocks of the data object) is stored in the storage system 140. With example implementations of the present disclosure, only the data object (or part of data blocks of the data object) that is not stored in the storage system may be stored to the storage system. In this way, the utilization efficiency of the storage system 140 may be improved more effectively, and extra overheads of managing a plurality of copies in the storage system 140 may be reduced.

It will be understood that the storage system 140 here may comprise a plurality of storage devices. Therefore, besides the first storage device 110, there is a need to further determine whether the data object is present in other storage devices. As shown at block 420 in FIG. 4, it may be determined whether the data object is present in the first storage device 110. If it is determined that the data object is not present in the first storage device 110, the second storage device 120 may be notified to search for the data object in the second storage device 120. It will be understood that a method for searching for the data object in the second storage device 120 is similar to the method 500 described with reference to FIG. 5.

Specifically, a message may be sent from the first storage device 110 to the second storage device 120 so as to indicate a search in the second storage device 120. The search may be carried out by the local manager 222 in the second storage device 120 according to different types of hashes. According to example implementations of the present disclosure, the data object matching the hash may be searched for in the second storage device 120 based on a second storage rule of the second storage device 120.

It will be understood that the storage system 140 may comprise a plurality of storage devices. At this point, a local manager needs to be deployed in each storage device so as to manage data access operations in the storage device, and furthermore one or more remote managers need to be deployed for managing data access operations in storage devices other than this storage device. Suppose the storage system 140 comprises N storage devices, then 1 local manager and (N−1) remote managers need to be deployed at each storage device.

Figure 6:
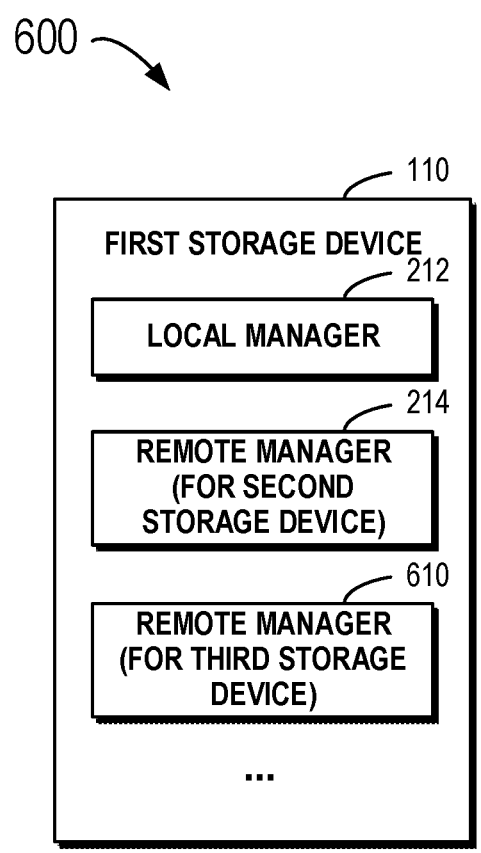
FIG. 6 schematically shows a block diagram of a configuration of a storage device according to one implementation of the present disclosure.

FIG. 6 schematically shows a block diagram 600 of a configuration of a storage device according to one implementation of the present disclosure. As depicted, suppose the storage system 140 comprises the first storage device 110, the second storage device 120 and a third storage device, etc. At the first storage device, the local manager 212 may be deployed for managing data access operations in the first storage device 212, the remote manager 214 may be deployed for managing data access operations in the second storage device 214, and a remote manager 610 may be deployed for managing data access operations in the third storage device, etc. Similarly, at the second storage device 120, a local manager may be deployed, and other remote managers may further be deployed for managing data access operations in other storage devices like the first storage device 110, the third storage device and so on.

Description is presented below for operations performed in a remote manager. As shown at block 430 in FIG. 4, the data object may be written to the storage system 140 according to the search result of searching for the data object in the second storage device 120. Now, more details on how to search for a data object in a remote storage device will be described with reference to FIG. 7. This figure schematically shows a flowchart of a method 700 for searching for a data object in a remote storage device according to one implementation of the present disclosure. As depicted, at block 710, the second storage device 120 may receive a hash of the data object. Here the hash may be the above-described metadata-based hash, data block-based hash or a combination thereof. At block 720, the data object matching the hash may be searched for in the second storage device 120. For example, the search may be carried out with the above method based on the type of the hash and the second storage rule of the second storage device 120.

At block 730, if it is determined that the matching data object is present, then the method 700 proceeds to block 740 so as to return an address of the found data object to the first storage device 110. Here the address refers to an address of the found data object in the second storage device 120. If it is determined that no matching data object is present in the second storage device 120, then the method 700 proceeds to block 750. At this point, "null" may be returned to the first storage device 110, indicating the data object is not present in the second storage device 120.

Figure 7:
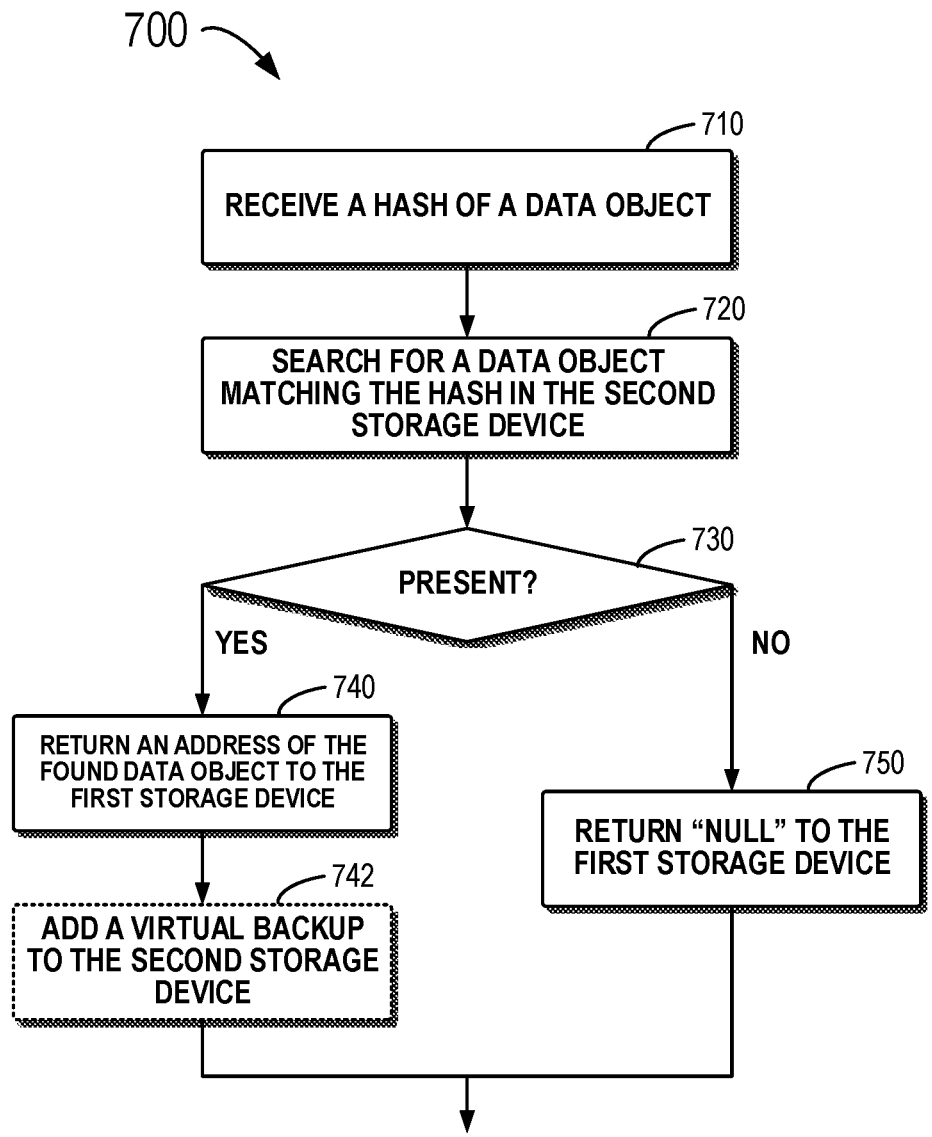
FIG. 7 schematically shows a flowchart of a method of searching for a data object in a remote storage device according to one implementation of the present disclosure.

It will be understood although FIG. 7 only illustrates the procedure of searching for a data object in the second storage device 120, each data block of the data object may be searched for in the second storage device 120 in a similar way. There is a possibility that the second storage device 120 only comprises part of the data blocks of the data object, at which point an address of the part of data blocks in the second storage system 120 may be returned to the first storage device 110. Further, other data blocks that are not present in either the first storage device 110 or the second storage device 120 may be written to the first storage device 110.

It will be understood although description has been presented to the circumstance in which there is only one remote storage device (i.e., the second storage device 120), according to example implementations of the present disclosure, there may further exist more remote storage devices. At this point, a plurality of remote managers 214 in the first storage device 110 may send information to corresponding remote storage devices, respectively, so as to launch an operation of searching for a data object in a corresponding remote storage device.

The method 700 performed at the second storage device 120 has been described with reference to FIG. 7. The method may be started via a call from the remote manager 214 of the first storage device 110. Subsequently, the first storage device 110 may receive a message returned from the second storage device 120. Returning to block 440 in FIG. 4, at the first storage device 110, the address mapping 320 of the data object may be determined based on an address to which the data object is written in the storage system 140. Specifically, if the data object is present in the second storage device 120, then the address mapping 320 may be updated based on the address returned from the second storage device 120. If the data object is not present in the second storage device 120 ("null" is returned), then the data object may be written to the first storage device 110.

In order to save the bandwidth between the backup client 240 and the storage system 140, first a hash of the data object to be stored may be sent to the first storage device 110, so as to determine whether the data object is present in the storage system 140. If a determination result is "no," then the first storage device 110 may receive a data object from the backup client 240, and the data object may be stored in the first storage device 110. With example implementations of the present disclosure, on the one hand, the data object may be transmitted only when necessary and the bandwidth requirement may be reduced, and on the other hand, duplicated data in the storage system 140 may be effectively removed and the management complexity in the storage system 140 may be reduced.

According to example implementations of the present disclosure, a virtual backup may be created for the data object in the remote storage device. Here the virtual backup means the data object in the remote storage device is referenced by other storage device. For example, if it is determined that the data object matching the hash is present in the second storage device 120, then the virtual backup of the data object may be written to the second storage device 120. It will be understood that the virtual backup here does not comprise data in the data object, but is merely an index for indicating the matching data object in the second storage device 120 is referenced. For example, the virtual backup may indicate the data object in the second storage device 120 is a data object (or part of a data object) the user application system wants to write. As shown at block 742 in FIG. 7, the virtual backup may be added to the second storage device 120.

According to example implementations of the present disclosure, an expiration time may be set for the data object. Here the expiration time refers to the time duration specified by the write request for which the data object is stored in the storage system 140. It will be understood that, regarding the user application system, the data object may be, for example, a plurality of versions of the same file in different time periods. For example, suppose a user is editing a document, and every day he/she backs up in the storage system a version of the document formed on that day. As time elapses, the storage system 140 will comprise a number of versions. In general, the older a version, the lower the possibility the version will be used. At this point, an expiration time may be set for each version of the document. For example, the expiration time may be set to 30 days, and the earliest version will be deleted from the storage system 140 on the $31^{st}$ day. In this way, it may be ensured space taken by a data object in the storage system 140 which has not been accessed for a long time may be released in time. According to example implementations of the present disclosure, the expiration time may be added to the virtual backup so as to manage references to the data object.

The virtual backup is created with a purpose of facilitating the management of data objects in the storage system. For example, when a certain data object expires, since the virtual backup comprises the same expiration time, data belonging to this data object may be deleted from all storage devices in a distributed way. According to example implementations of the present disclosure, when a data object needs to be deleted, it is only required to notify other storage devices to delete a corresponding virtual backup and data objects associated with the virtual backup. According to example implementations of the present disclosure, a replication operation may further be performed among various storage devices so as to provide higher data reliability. When there is a need for replication, data may be replicated via the virtual backup, instead of checking complex reference relations of all backup data.

It will be understood that storage space in one or more storage devices in the storage system 140 may run out as the storage system 140 runs. At this point, data migration may be performed among a plurality of storage devices in the storage system 140. For example, if it is determined that the first workload of the first storage device 110 is higher than a predetermined threshold (e.g., used storage space amounts to 90% or other value), then data objects in the first storage device 240 may be migrated to a storage device with a lower workload. For example, suppose the second workload of the second storage device 120 is 60%, and then part of data objects in the first storage device 110 may be migrated to the second storage device 120.

According to example implementations of the present disclosure, when a certain storage device has a heavy workload, a user application system that used to be registered to this storage device may be registered to a storage device with a lower workload. Suppose the user application system registered to the first storage device 110 makes a higher backup demand, if the first storage device 110 is already under a heavy workload, then free storage space in the first storage device 110 will soon run out if the first storage device 110 still serves the user application system. At this point, if it is determined that the first workload is higher than the predetermined threshold, then the user application system may be registered to the second storage device 120 with a lower workload.

With reference to FIGS. 2 to 7, description has been presented on how to write a data object to the storage system 140 and migrate a data object therein. According to example implementations of the present disclosure, a data object may be read from the storage system 140. Specifically, a read request may be received for reading a target data object from the storage system 140. For example, the read request may be read from the backup client 240. Subsequently, the target data object specified by the read request may be read from the storage system according to the address mapping. It will be understood that the data object may be obtained based on the address mapping 320 since the address mapping 320 comprises an address of a data object (or various data blocks in the data object) in the storage system 140.

According to example implementations of the present disclosure, if it is determined that the address mapping 320 indicates the target data object is present in the first storage device 110, then the target data object may be obtained from a specified address in the first storage device 110 based on the first storage rule of the first storage device 110. Specifically, when the first storage device 110 receives a read request, first an address of the target data object may be found in the address mapping 320 based on an identifier of the target data object in the read request. Subsequently, a search may be conducted at the specified address in the first storage device 110. For example, the search may be conducted by the local manager 212. If the desired target data object is found, then the found target data object may be returned to the backup client 240.

Figure 8:
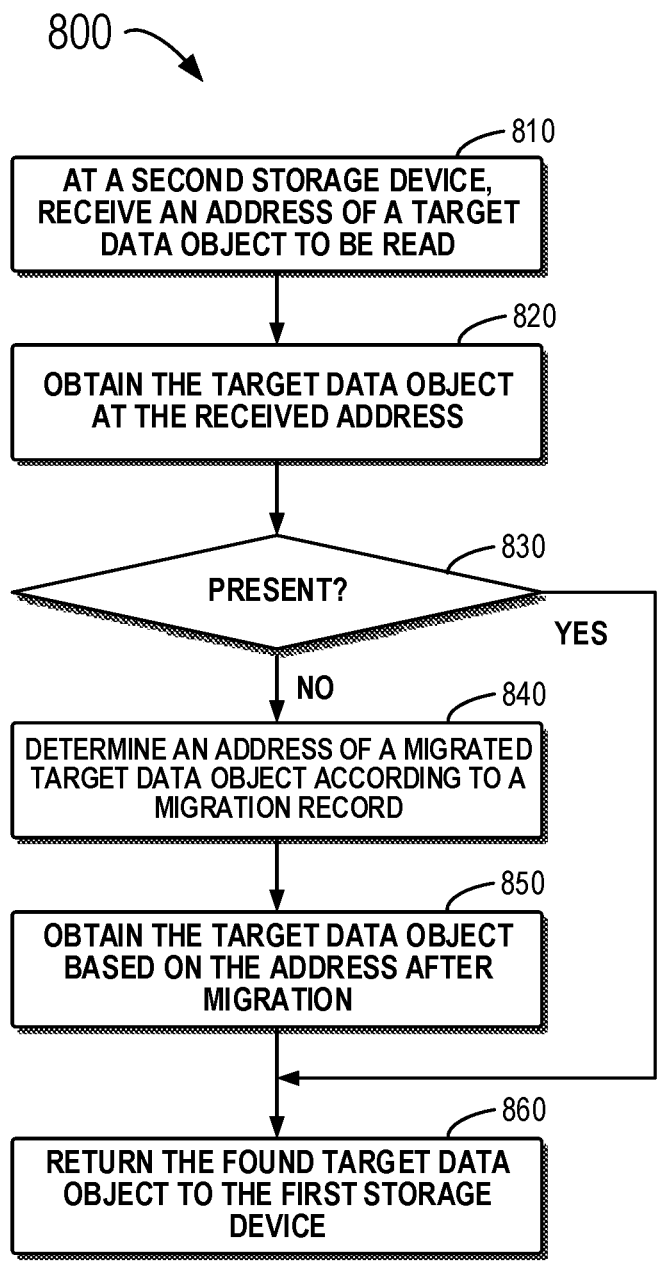
FIG. 8 schematically shows a flowchart of a method of returning a data object from a remote storage device to a local storage device according to one implementation of the present disclosure.

If it is determined that the address mapping 320 indicates the target data object is presented in the second storage device 120, then the remote manager 214 may send a message to the second storage device 120 to indicate a search in the second storage device 120. At this point, the second storage device 120 searches for the target data object in itself based on the second storage rule. With reference to FIG. 8, description is presented below to a procedure of reading data from the storage system.

FIG. 8 schematically shows a flowchart of a method 800 of returning a data object from a remote storage device to a local storage device. As depicted, at block 810, an address of a target data object to be read may be received at the second storage device 120. At block 820, the target data object may be obtained from the received address. It will be understood that for reasons like failure treatment and load balance, a data object that used to reside at a certain address may be migrated to a new address (e.g., the new address may be in the same or different storage device), so it is possible that target data cannot be found at the obtained address.

At block 830, it may be determined whether the target data object is found. If the target object is found, then the method 800 proceeds to block 860 so as to return the found target data object to the first storage device 110. At block 830, if the target data object is not found, the method 800 proceeds to block 840, at which an address of the migrated target data object may be determined according to a migration record. At block 850, the target data object may be obtained based on the address after migration. Then at block 860, the found target data object may be returned to the first storage device 110.

It will be understood that illustration has been presented to the circumstance in which a target data object is read from the storage system 140. According to example implementations of the present disclosure, the target data object may further comprise a plurality of data blocks, at which point each data block among the plurality of data blocks may be searched for in the storage system 140 in a similar way. For example, the address mapping 320 may indicate: part of data blocks among the plurality of data blocks reside in the first storage device 110, while the other part of data blocks reside in the second storage device 120. Then, corresponding data blocks may be obtained by the local manager 212 and the remote manager 214, respectively. Next, data blocks which have been obtained may be combined to form a target data object, and the target data object may be returned to the backup client 240.

According to example implementations of the present disclosure, when free storage space in the storage system 140 is insufficient, a third storage device may further be added to the storage system 140. At this point, free space in the third storage device may be used to store data in the future. Alternatively and/or additionally, a data object in a storage device currently with a heavier workload may be migrated to the third storage device.

With example implementations of the present disclosure, the extension of storage space in the storage system may be conveniently managed. At this point, a local manager may be deployed at the third storage device to manage access to data in the third storage device. Further, a remote manager may be deployed at the third storage device to manage data access to a remote storage device other than the third storage device. Specifically, a first local manager may be deployed to manage access to data in the first storage device 110, and a second local manager may be deployed to manage access to data in the second storage device 120. Further, remote managers may be deployed at the first storage device 110 and the second storage device 120, respectively, to manage access to data in the third storage device.

With example implementations of the present disclosure, the local manager and the remote manager(s) at each storage device may manage access to data in the storage system. In this way, without a complex centralized manager, it is possible to coordinate operations of various storage devices in the storage system 140 and further accomplish data writes, data reads, data migration and extension of storage space.

According to example implementations of the present disclosure, if it is determined the data object is not present in the first storage device 110, another remote manager in the first storage device 110 may send a message to the third storage device to instruct the third storage device to search for the data object in itself. Further, the remote manager may receive a message from the third storage device and write the data object to the storage system 140 according to a search result of searching for the data object in the third storage device. Further, an address mapping of the data object may be determined based on an address to which the data object is written in the storage system 140. It will be understood that the above procedure is similar to operations at blocks 420, 430 and 440 in FIG. 4.

While examples of the methods 400, 500, 700 and 800 according to the present disclosure have been described in detail with reference to FIGS. 2 to 8, description is presented below to the implementation of a corresponding apparatus. According to example implementations of the present disclosure, provided is an apparatus for managing a storage system, here the storage system comprises a first storage device and a second storage device. The apparatus comprises: a first search module configured to search for a data object specified by a write request in the first storage device, the write request specifying the data object that is to be written to the storage system; a second search module configured to, in accordance with determining the data object is not present in the first storage device, notify the second storage device to search for the data object in the second storage device; a writing module configured to write the data object to the storage system according to a search result of searching for the data object in the second storage device; and a determining module configured to determine an address mapping of the data object based on an address to which the data object is written in the storage system, wherein the address mapping indicates an address of the data object in the storage system, the apparatus being implemented at the first storage device.

According to example implementations of the present disclosure, the first search module comprises: a hash obtaining module configured to obtain a hash of the data object; and a first data object search module configured to search for a data object matching the hash in the first storage device based on a first storage rule of the first storage device.

According to example implementations of the present disclosure, the hash further comprises a group of block hashes of a group of data blocks in the data object; and the first search module further comprises: a block search module configured to search for a group of data blocks matching the group of block hashes in the first storage device according to the first storage rule.

According to example implementations of the present disclosure, the address mapping determining module is configured to, according to determining the data object matching the hash is present in the first storage device, determine an address mapping of the data object based on an address of the data object in the first storage device.

According to example implementations of the present disclosure, the second search module is configured to notify the second storage device to search for the data object matching the hash in the second storage device based on a second storage rule of the second storage device.

According to example implementations of the present disclosure, the writing module is further configured to, according to determining the data object matching the hash is not present in the second storage device, write the data object to the first storage device.

According to example implementations of the present disclosure, the writing module comprises: a virtual writing module configured to, according to determining the data object matching the hash is not present in the second storage device, write a virtual backup of the data object to the second storage device, the virtual backup indicating the data object in the second storage device is referenced.

According to example implementations of the present disclosure, a timing module is configured to set an expiration time for the data object, the expiration time representing time duration of storing the data object in the storage system as specified by the write request.

According to example implementations of the present disclosure, a receiving module is configured to receive a read request for reading a target data object from the storage system; and a reading module is configured to read the target data object specified by the read request from the storage system according to the address mapping.

According to example implementations of the present disclosure, the reading module comprises: a first reading module configured to, according to determining the address mapping indicates the target data object is present in the first storage device, search for the target data object in the first storage device based on a first storage rule of the first storage device; and a second reading module configured to, according to determining the address mapping indicates the target data object is present in the second storage device, notify the second storage device to search for the target data object in the second storage device based on a second storage rule of the second storage device.

According to example implementations of the present disclosure, the write request is received via a backup client installed at a user application system, the storage system being connected to the user application system to store a backup of a data object in the user application system.

According to example implementations of the present disclosure, further comprised is a registering module configured to register the user application system to one of the first storage device and the second storage device to serve the user application system, based on a first workload of the first storage device, a second workload of the second storage device and a backup demand of the user application system.

According to example implementations of the present disclosure, further comprised is a migration module configured to, according to determining the first workload is greater than a predetermined threshold, migrate a data object in the first storage device to the second storage device, the second workload being lower than the first workload.

According to example implementations of the present disclosure, the registering module is further configured to, according to determining the first workload is greater than a predetermined threshold, register the user application system to the second storage device, the second workload being lower than the first workload.

According to example implementations of the present disclosure, further comprised is a third search module configured to, according to determining the data object is not present in the first storage device, search for the data object in a third storage device in the storage system; the writing module is further configured to write the data object to the storage system according to a search result of searching for the data object in the third storage device; and the determining module is further configured to determine the address mapping of the data object based on an address to which the data object is written in the storage system.

According to example implementations of the present disclosure, the third storage device is added to the storage system according to determining a workload of the storage system is greater than a predetermined threshold.

Figure 9:
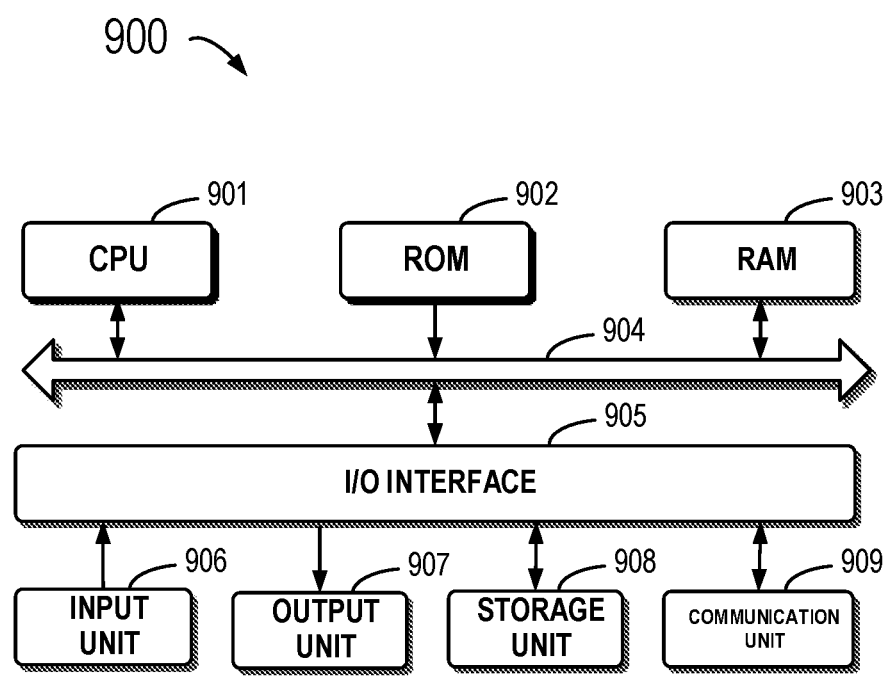
FIG. 9 schematically shows a block diagram of a device for managing a storage system according to example implementations of the present disclosure.

FIG. 9 schematically shows a block diagram of a device 900 for managing an address mapping of a storage system according to example implementations of the present disclosure. As depicted, the device 900 includes a central processing unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the device 900. CPU 901, ROM 902 and RAM 903 are connected to each other via a bus 904. The input/output (I/O) interface 905 is also connected to the bus 904.

A plurality of components in the device 900 are connected to the I/O interface 905, including: an input unit 906, such as a keyboard, mouse and the like; an output unit 907, e.g., various kinds of displays and loudspeakers etc.; a storage unit 908, such as a magnetic disk and optical disk, etc.; and a communication unit 909, such as a network card, modem, wireless transceiver and the like. The communication unit 909 allows the device 900 to exchange information/data with other devices via the computer network, such as Internet, and/or various telecommunication networks.

The above described process and treatment, such as the methods 400, 500, 700 and 800 can also be executed by the processing unit 901. For example, in some implementations, the methods 400, 500, 700 and 800 can be implemented as a computer software program tangibly included in the machine-readable medium, e.g., the storage unit 908. In some implementations, the computer program can be partially or fully loaded and/or mounted to the device 900 via ROM 902 and/or the communication unit 909. When the computer program is loaded to the RAM 903 and executed by the CPU 901, one or more steps of the above described methods 400, 500, 700 and 800 can be implemented. Alternatively, in other implementations, the CPU 901 also can be configured in other suitable manners to realize the above procedure/method.

According to example implementations of the present disclosure, provided is a device for managing an address mapping of a storage system, the storage system comprising a first storage device and a second storage device. The device comprises: at least one processor; and a memory coupled to the at least one processor, the memory having instructions stored thereon, the instructions, when executed by the at least one processor, causing the device to perform a method. The method includes: searching for a data object specified by a write request in the first storage device, the write request specifying the data object that is to be written to the storage system; according to determining the data object is not present in the first storage device, notifying the second storage device to search for the data object in the second storage device; writing the data object to the storage system according to a search result of searching for the data object in the second storage device; and determining an address mapping of the data object based on an address to which the data object is written in the storage system, where the address mapping indicates an address of the data object in the storage system, and the method is implemented at the first storage device.

According to example implementations of the present disclosure, searching for the data object specified by the write request in the first storage device comprises: obtaining a hash of the data object; and searching for the data object matching the hash in the first storage device based on a first storage rule of the first storage device.

According to example implementations of the present disclosure, the hash further comprises a group of block hashes of a group of data blocks in the data object; and searching for the data object matching the hash in the first storage device based on a first storage rule of the first storage device comprises: searching for a group of data blocks matching the group of block hashes in the first storage device according to the first storage rule.

According to example implementations of the present disclosure, the method further comprises: according to determining the data object matching the hash is present in the first storage device, determining an address mapping of the data object based on an address of the data object in the first storage device.

According to example implementations of the present disclosure, searching for the data object in the second storage device comprises: notifying the second storage device to search for the data object matching the hash in the second storage device based on a second storage rule of the second storage device.

According to example implementations of the present disclosure, writing the data object to the storage system according to the search result of searching for the data object in the second storage device comprises: according to determining the data object matching the hash is not present in the second storage device, writing the data object to the first storage device.

According to example implementations of the present disclosure, writing the data object to the storage system according to the search result of searching for the data object in the second storage device comprises: according to determining the data object matching the hash is not present in the second storage device, writing a virtual backup of the data object to the second storage device, the virtual backup indicating the data object in the second storage device is referenced.

According to example implementations of the present disclosure, the method further comprises: setting an expiration time for the data object, the expiration time representing time duration of storing the data object in the storage system as specified by the write request.

According to example implementations of the present disclosure, the method further comprises: receiving a read request for reading a target data object from the storage system; and reading the target data object specified by the read request from the storage system according to the address mapping.

According to example implementations of the present disclosure, reading the target data object specified by the read request from the storage system according to the address mapping comprises at least one of: according to determining that the address mapping indicates the target data object is present in the first storage device, searching for the target data object in the first storage device based on a first storage rule of the first storage device; and according to determining that the address mapping indicates the target data object is present in the second storage device, notifying the second storage device to search for the target data object in the second storage device based on a second storage rule of the second storage device.

According to example implementations of the present disclosure, the write request is received via a backup client installed at a user application system, and the storage system is connected to the user application system to store a backup of a data object in the user application system.

According to example implementations of the present disclosure, the method further comprises: registering the user application system to one of the first storage device and the second storage device to serve the user application system, based on a first workload of the first storage device, a second workload of the second storage device and a backup demand of the user application system.

According to example implementations of the present disclosure, the method further comprises: according to determining that the first workload is greater than a predetermined threshold, migrating a data object in the first storage device to the second storage device, the second workload being lower than the first workload.

According to example implementations of the present disclosure, the method further comprises: according to determining that the first workload is greater than a predetermined threshold, registering the user application system to the second storage device, the second workload being lower than the first workload.

According to example implementations of the present disclosure, the method further comprises: according to determining that the data object is not present in the first storage device, searching for the data object in a third storage device in the storage system; writing the data object to the storage system according to a search result of searching for the data object in the third storage device; and determining an address mapping of the data object based on an address to which the data object is written in the storage system.

According to example implementations of the present disclosure, the third storage device is added to the storage system according to determining that a workload of the storage system is greater than a predetermined threshold.

According to example implementations of the present disclosure, there is provided a computer program product. The computer program product is tangibly stored on a non-transitory computer readable medium and comprises machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to implementations of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the various implementations explained, are obvious for those skilled in the art. The selection of terms in the text aims to best explain principles and actual applications of each implementation and technical improvements made in the market by each implementation, or enable others of ordinary skill in the art to understand implementations of the present disclosure.

We claim:

1. A method for managing a storage system, the storage system comprising a first storage device and a second storage device, the method comprising:
    searching for a data object specified by a write request in the first storage device, the write request specifying the data object that is to be written to the storage system, wherein the write request is received via a backup client installed at a user application system, the storage system being connected to the user application system to store a backup of the data object in the user application system;
    registering the user application system to one of the first storage device and the second storage device to serve the user application system, based on a first workload of the first storage device, a second workload of the second storage device and a backup demand of the user application system;
    according to determining the data object is not present in the first storage device, notifying the second storage device to search for the data object in the second storage device;
    writing the data object to the storage system according to a search result of searching for the data object in the second storage device; and
    determining an address mapping of the data object based on an address to which the data object is written in the storage system, wherein the address mapping indicates an address of the data object in the storage system, the method being implemented at the first storage device, the address mapping being updated if the data object is present in the second storage device.

2. The method of claim 1, wherein searching for the data object specified by the write request in the first storage device comprises:
    obtaining a hash of the data object; and
    searching for a data object matching the hash in the first storage device based on a first storage rule of the first storage device.

3. The method of claim 2, wherein the hash further comprises a group of block hashes of a group of data blocks in the data object; and
    searching for the data object matching the hash in the first storage device based on the first storage rule of the first storage device comprises: searching for a group of data blocks matching the group of block hashes in the first storage device according to the first storage rule.

4. The method of claim 2, further comprising:
    according to determining that the data object matching the hash is present in the first storage device, determining an address mapping of the data object based on an address of the data object in the first storage device.

5. The method of claim 2, wherein searching for the data object in the second storage device comprises: notifying the second storage device to search for the data object matching the hash in the second storage device based on a second storage rule of the second storage device.

6. The method of claim 5, wherein writing the data object to the storage system according to the search result of searching for the data object in the second storage device comprises:
    according to determining the data object matching the hash is not present in the second storage device, writing the data object to the first storage device.

7. The method of claim 5, wherein writing the data object to the storage system according to the search result of searching for the data object in the second storage device comprises:
    according to determining the data object matching the hash is not present in the second storage device, writing a virtual backup of the data object to the second storage device, the virtual backup indicating the data object in the second storage device is referenced.

8. The method of claim 1, further comprising:
    setting an expiration time for the data object, the expiration time representing time duration of storing the data object in the storage system as specified by the write request.

9. The method of claim 1, further comprising:
    receiving a read request for reading a target data object from the storage system; and
    reading the target data object specified by the read request from the storage system according to the address mapping.

10. The method of claim 9, wherein reading the target data object specified by the read request from the storage system according to the address mapping comprises at least one of:
    according to determining that the address mapping indicates the target data object is present in the first storage device, searching for the target data object in the first storage device based on a first storage rule of the first storage device; and
    according to determining that the address mapping indicates the target data object is present in the second storage device, notifying the second storage device to search for the target data object in the second storage device based on a second storage rule of the second storage device.

11. The method of claim 1, further comprising:
    according to determining that the first workload is greater than a predetermined threshold, migrating the data object in the first storage device to the second storage device, the second workload being lower than the first workload.

12. The method of claim 1, further comprising:
    according to determining that the first workload is greater than a predetermined threshold, registering the user application system to the second storage device, the second workload being lower than the first workload.

13. The method of claim 1, further comprising:
    according to determining that the data object is not present in the first storage device, searching for the data object in a third storage device in the storage system;
    writing the data object to the storage system according to a search result of searching for the data object in the third storage device; and
    determining the address mapping of the data object based on an address to which the data object is written in the storage system.

14. The method of claim 13, wherein the third storage device is added to the storage system according to determining that a workload of the storage system is greater than a predetermined threshold.

15. A device for managing a storage system, the storage system comprising a first storage device and a second storage device, the device comprising:
    at least one processor; and
    a memory coupled to the at least one processor and having instructions stored thereon, the instructions, when executed by the at least one processor, causing the device to perform operations, the operations comprising:
- searching for a data object specified by a write request in the first storage device, the write request specifying the data object that is to be written to the storage system, wherein the write request is received via a backup client installed at a user application system, the storage system being connected to the user application system to store a backup of the data object in the user application system;
- registering the user application system to one of the first storage device and the second storage device to serve the user application system, based on a first workload of the first storage device, a second workload of the second storage device and a backup demand of the user application system;
- according to determining the data object is not present in the first storage device, notifying the second storage device to search for the data object in the second storage device;
- writing the data object to the storage system according to a search result of searching for the data object in the second storage device; and
- determining an address mapping of the data object based on an address to which the data object is written in the storage system, wherein the address mapping indicates an address of the data object in the storage system, the address mapping being updated if the data object is present in the second storage device.

16. The device of claim 15, wherein searching for the data object specified by the write request in the first storage device comprises:
- obtaining a hash of the data object; and
- searching for a data object matching the hash in the first storage device based on a first storage rule of the first storage device.

17. The device of claim 15, further comprising:
- according to determining that the first workload is greater than a predetermined threshold, migrating the data object in the first storage device to the second storage device, the second workload being lower than the first workload.

18. A computer program product, tangibly stored on a non-transitory computer readable medium and comprising machine executable instructions, which when executed by a processor, cause the processor to perform operations, the operations comprising:
- searching for a data object specified by a write request in a first storage device, the write request specifying the data object that is to be written to a storage system, the storage system comprising the first storage device and a second storage device, wherein the write request is received via a backup client installed at a user application system, the storage system being connected to the user application system to store a backup of the data object in the user application system;
- registering the user application system to one of the first storage device and the second storage device to serve the user application system, based on a first workload of the first storage device, a second workload of the second storage device and a backup demand of the user application system;
- according to determining the data object is not present in the first storage device, notifying the second storage device to search for the data object in the second storage device;
- writing the data object to the storage system according to a search result of searching for the data object in the second storage device; and
- determining an address mapping of the data object based on an address to which the data object is written in the storage system, wherein the address mapping indicates an address of the data object in the storage system, the address mapping being updated if the data object is present in the second storage device.

19. The computer program product of claim 18, wherein searching for the data object specified by the write request in the first storage device comprises:
- obtaining a hash of the data object; and
- searching for a data object matching the hash in the first storage device based on a first storage rule of the first storage device.

20. The computer program product of claim 18, further comprising:
- according to determining that the first workload is greater than a predetermined threshold, migrating the data object in the first storage device to the second storage device, the second workload being lower than the first workload.

* * * * *